T. L. TALIAFERRO.
METHOD OF FORMING SEALING RINGS FOR COVERS.
APPLICATION FILED MAR. 7, 1916.
1,299,259.
Patented Apr. 1, 1919.
2 SHEETS—SHEET 1.
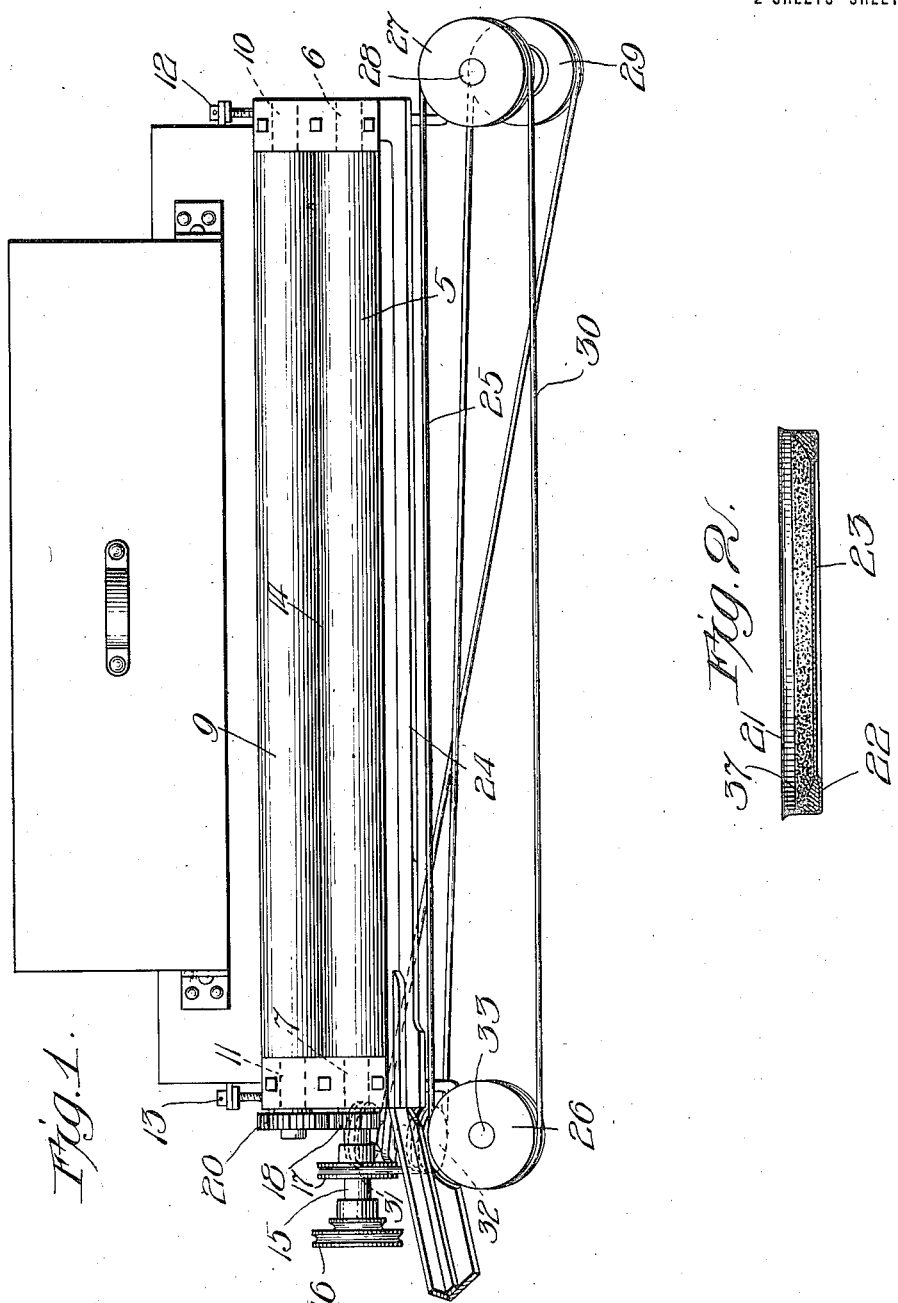

UNITED STATES PATENT OFFICE.

THOMAS L. TALIAFERRO, OF CHICAGO, ILLINOIS.

METHOD OF FORMING SEALING-RINGS FOR COVERS.

1,299,259.  Specification of Letters Patent.  Patented Apr. 1, 1919.

Application filed March 7, 1916. Serial No. 82,563.

*To all whom it may concern:*

Be it known that I, THOMAS L. TALIAFERRO, a citizen of the United States, residing at Chicago, county of Cook, and State of Illinois, have invented certain new and useful Improvements in Methods of Forming Sealing-Rings for Covers, of which the following is a specification.

This invention has to do with improvements in the method of applying sealing rings to covers and the like for use in the sealing of jars, bottles and other similar receptacles. The method herein disclosed is very well adapted for use in the forming of such covers as above mentioned, when said covers are to be used in the sealing of vacuum jars and the like, such as are used for the shipment and preservation of fruits, preserves, etc. It will presently appear, however, that the method herein disclosed may be used with great advantage in the formation of many other objects than covers intended for the above mentioned service.

In my Letters Patent of the United States, No. 1,089,093, issued March 3, 1914, for improvements in method of forming sealing rings for glass or porcelain covers, I have disclosed a method which is very well adapted for the formation of the sealing rings on the covers when said covers are provided with annular shoulders onto which the material may be conveniently applied. Likewise in my Letters Patent of the United States, No. 1,089,350, issued March 3, 1914, for improvements in apparatus for coating covers, I have disclosed an apparatus which is very well adapted for carrying into effect the method disclosed in said Letters Patent, No. 1,089,093.

The method and apparatus disclosed in the aforesaid Letters Patent are found to operate with entire satisfaction in those cases where the cover is provided with an annular shoulder or ledge onto which the material may be applied, or in those cases wherein the material so to be applied is of relatively high viscosity or thickness. In such cases the application of the material in the manner described in such Letters Patent is found to be quite satisfactory.

However, I have found that in many cases the employment of the method and apparatus disclosed in those Letters Patent is not entirely satisfactory, or where it is satisfactory in many cases it may be improved upon. I have discovered furthermore, that in many cases wherein the sealing material to be applied is of relatively thin consistency or viscosity it need not be applied in spiral form and neither need it be applied to a cover having an annular shoulder or ledge. In the case of such relatively thin material having a viscosity approximating that of syrup for example, it may be applied to an annular groove or notch during a single encircling of the disk, and in sufficient quantity to give the desired sealing ring, while at the same time securing a substantially uniform thickness and quality throughout.

It will be understood that where the material is of relatively high viscosity or constituency, said material should be applied in a comparatively thin layer encircling the cover a sufficient number of times to give the desired total thickness, as otherwise there may be a tendency to apply the material in uneven or unequal thickness at various points throughout the circle, and therefore in the case of such material of relatively high viscosity it is desirable to spiral the same into place on the cover. On the other hand, as before stated, where the material is of relatively low consistency or viscosity, a sufficient thickness may be applied at a single operation to give the desired thickness of the completed sealing ring, while at the same time having assurance that the sealing ring will be of substantially uniform thickness and character throughout the circle. In such case it is unnecessary to spiral the material into position in the sense that it is unnecessary for subsequent layers of the material to press down or press farther back those layers which were previously applied. An advantage following from this fact is that the desired amount of material can be applied in fewer revolutions of the cover than where the material is of relatively high viscosity, and consequently a higher rate of operation may be secured on a given machine or the machine for performing certain work may be of smaller size than is necessary where using the material of relatively high viscosity.

It will be understood that ordinarily a very thin material cannot conveniently be applied to a peripheral shoulder or ledge for the reason that the material will tend to run off of said ledge or shoulder. Therefore, in carrying into effect the method of the present invention I find it very convenient to use a cover having an annular groove in one face, said groove being surrounded by a peripheral flange onto which the material may be initially scraped for application into the groove.

Referring now to the several drawings I have therein illustrated a construction of machine which is very well adapted for carrying into effect the features of the present invention.

In said drawings:

Figure 1 shows a plan view of the machine;

Fig. 2 shows a cross-section through a convenient form of cover into which the material may be applied according to the method of the present invention;

Figure 3:
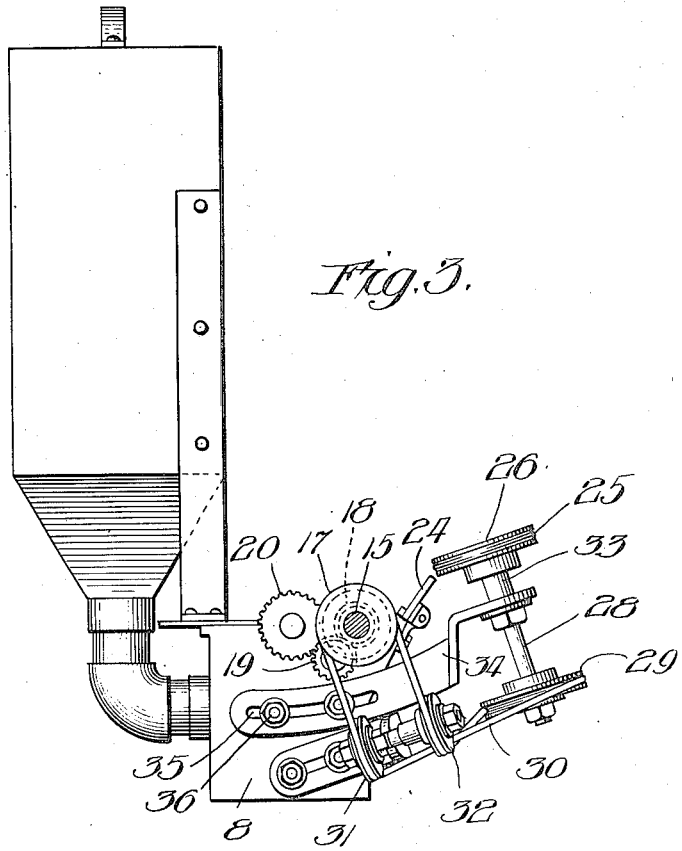
Fig. 3 shows an end elevation of the machine shown in Fig. 1.

The material applying roll is designated by the numeral 5. The same works within suitable journals 6 and 7, and its lower portion dips into a bath of liquid material 8. Said liquid material is the material which when applied to the covers forms the sealing rings. Adjacent to the roller 5 is another roller 9 journaled at the points 10 and 11 in such a manner that it may be adjusted laterally toward and from the roller 5 by means of the screws 12 and 13, so as to regulate the distance 14 between the rollers. The rollers are both driven into the directions indicated by the arrows in Fig. 4, the roller 5 carrying up material from the bath and the roller 9 regulating or governing the thickness of the material so carried up.

A convenient means of driving the rollers in the manner just explained is one wherein the roller 5 has an extending shaft 15 whereon are mounted the pulleys 16 and 17. The pulley 16 is the driving pulley and the pulley 17 performs another function presently to be explained. The shaft 15 also has the gear 18 meshing with the idler pulley 19, which idler pulley in turn meshes with the gear 20 connected to the roller 9. Driving the pulley 16, therefore, serves to drive both of the rollers in the directions indicated.

The cover illustrated particularly in Fig. 2 is circular in form and has a peripheral flange 21 immediately just inside of which is an annular groove or depression 22. The central portion 23 of the cover is raised above the groove and serves to provide the inside shoulder of the groove. In Fig. 2 the sealing ring or gasket is shown in cross-section as having been applied to the cover.

Figure 4:
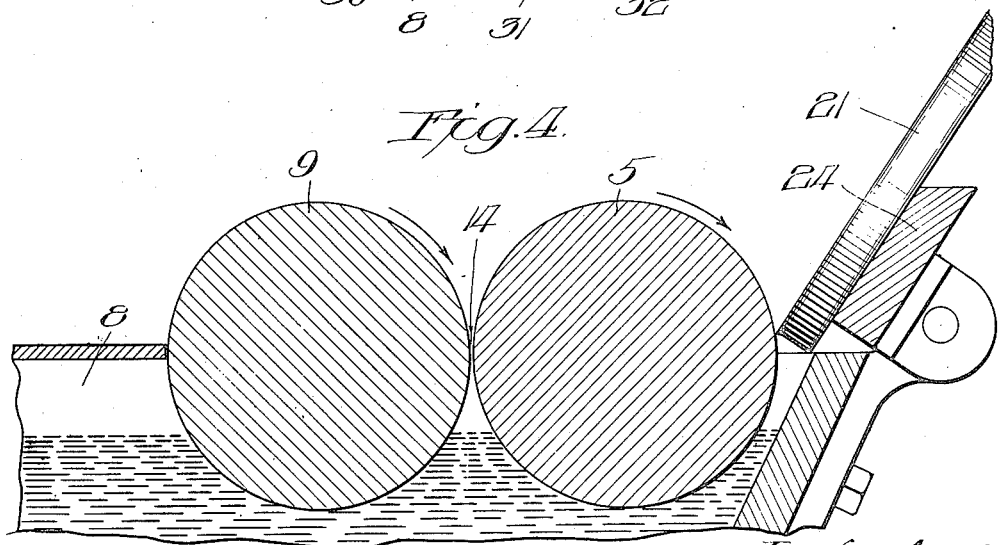
Fig. 4 shows a cross-section through the material applying rolls, one of the covers being in position against the proper roll.

Reference to Fig. 4 shows the manner in which the cover is supported against the roller 5. This support is accomplished by a longitudinally extending platform 24, against which the cover seats. This platform lies at a considerable angle to the horizontal, so that the cover will slide down until the edge of its annular flange 21 comes into contact with the roller 5. Furthermore, such contact is accomplished at such an angle that as the roller rotates in the direction of the arrow the material carried on its surface will be scraped onto the inside of the flange of the cover. Said material will then settle down into the annular groove to form the sealing ring, and the horizontal level of the sealing material thus flowed or scraped on to the flange or body of the cover will determine the inner and outer limits of the sealing ring.

In order to secure an application of material to the entire periphery of the cover, said cover is rotated on its own axis while the roller is applying the material. A convenient method of accomplishing this result is to roll the cover along on the platform 24 while keeping the edge of the cover flange in contact with the roller. In order to roll along the cover in the manner mentioned I have indicated a traveling belt 25 working over the pulleys 26 and 27, the inner layer of said belt lying close to the upper edge of the platform and in such position that the cover will lie against the belt and will be driven along by the movement of the belt. This will cause the cover to travel along the roller 5 in a longitudinal direction.

The pulley 27 is conveniently mounted on a short shaft 28, the lower end of said shaft having a pulley 29. A belt 30 works over the pulley 29 and also over a pair of idlers 31 and 32 and then over the pulley 17 previously described. Thus the belt 25 is driven from the same source of power as is used for the rotation of the rollers.

The roller 26 is conveniently mounted on a spindle 33, which in turn is carried by a bracket 34. Said bracket has the slot 35, so that it may be adjusted back and forth with respect to the frame of the machine and locked in any desired position by means of the screws 36. This will make it possible to adjust one end of the belt 25 with respect to the platform 24, and a similar adjustment is provided for the other end of said belt.

Referring to Fig. 2 the sealing ring is therein designated by the numeral 37. The material of said ring is initially applied on the upper edge of the flange 21 and then it settles down into the groove 22. The material is able to do this by reason of the fact that it is of relatively low viscosity. Therefore, a sealing ring of desired thickness and characteristics can be formed during a single rotation of the cover on its own axis.

I claim:

The method of forming a sealing ring on a cover, having a peripheral flange substantially at right angles to the body of the cover, which consists in presenting the edge of the flange to a surface thinly coated with a sealing material of relatively thin viscosity, supporting said cover so that the sealing material is caused to flow from said surface on to the inner face of the flange and the body of the cover and so that the horizontal level of the sealing material flowed on to the cover determines the inner and outer limits of the sealing ring, and shifting the point of contact between the edge of the flange and coated surface progressively about the entire peripheral edge of the cover for distributing the sealing material so as to form a sealing ring extending entirely about the peripheral edge of the cover.

THOMAS L. TALIAFERRO.

Witnesses:
   CHAS. H. McGARRAHAN,
   C. C. GILES.